United States Patent [19]

Nitta et al.

[11] 4,185,972

[45] Jan. 29, 1980

[54] ELECTRIC CHARGE HOLDING STRUCTURE FOR ELECTRETIZED AIR-FILTER MEDIUM

[75] Inventors: Sukekazu Nitta, Tokyo; Takuji Watanabe, Osaka; Takashi Takahira, Yamato-Kohriyama, all of Japan

[73] Assignee: Nitta Belt Kabushiki Kaisha, Osaka, Japan

[21] Appl. No.: 891,124

[22] Filed: Mar. 28, 1978

[30] Foreign Application Priority Data

Mar. 28, 1977 [JP] Japan .................................. 52-34887

[51] Int. Cl.² .............................................. B03C 3/02
[52] U.S. Cl. ...................................... 55/155; 55/100; 55/103; 55/131; 55/DIG. 39; 55/528; 307/400
[58] Field of Search ................ 55/100, 131, 103, 155, 55/DIG. 39, 528; 131/262; 361/233

[56] References Cited

U.S. PATENT DOCUMENTS

| | | | |
|---|---|---|---|
| 2,795,290 | 6/1957 | Butsch et al. | 55/103 |
| 3,118,022 | 1/1964 | Sessler et al. | 55/DIG. 39 |
| 3,449,093 | 6/1969 | Baxt et al. | 55/DIG. 39 |
| 4,035,164 | 7/1977 | Taylor | 55/528 |

OTHER PUBLICATIONS

Electrets–Andrew Germant–Physics Today, vol. 2, No. 3, pp. 8-13, 3-49.
Electrets–Dickinson—Plastics Research Co., Alhambra, California, pp. 1-31, 6/7/49.

*Primary Examiner*—Bernard Nozick
*Attorney, Agent, or Firm*—Wenderoth, Lind & Ponack

[57] ABSTRACT

The present invention is an improvement in electretized filtering means. This is an electric charge holding structure wherein the filter medium is covered on two opposite sides with an electrically conductive material having an air permeability that does not impair the air permeability of the filter and these two opposite sides are shorted together. This concept is similar to causing a short in the magnetic lines of force for the purpose of long time retention of the magnetic force as often employed in the vicinity of a permanent magnet. In this invention this idea is applied to electret as an air-filter medium.

5 Claims, 6 Drawing Figures

ELECTRIC CHARGE HOLDING STRUCTURE FOR ELECTRETIZED AIR-FILTER MEDIUM

BACKGROUND OF THE INVENTION

The present invention relates to a means retaining intact the surface charge density on electretized air-filter media for a longer period of time and in high density conditions.

A method for manufacturing a filter medium for air-filters wherein porous sheet material comprising synthetic fiber or the like is electretized is disclosed in Japanese Patent Application Publication No. Sho-51-115234, entitled "Method for electretizing porous sheet material", the applicant being the present applicant. Another disclosure of this sort by the same applicant is in Japanese Patent Application Publication No. Sho-51-116837, entitled "Method for manufacturing a filter medium for air-filters". The electret according to said two disclosures adsorbs fine particles suspended in the air by the coulomb force of the positive and negative charges on its two sides. At the same time, it must meet the same conditions that are required of ordinary air-filter media, such as suitable mesh fineness and low susceptibility to air resistance.

SUMMARY OF THE INVENTION

The present invention is concerned with such air-filter media and is intended particularly for the production of means capable of retaining high surface charge density and high adsorption capacity for a longer period of time.

The concept of this invention is similar to causing a short in the magnetic force lines for the purpose of longtime retention of magnetic force, as often employed in the area of a permanent magnet. The invention applies this idea to electret as an air-filter medium. The invention concerns a structure adapted for long time service as a high performance filter under actual use conditions and is not intended for application to filter media in storage. Needless to say, any filter medium in storage can be satisfactorily preserved only if it is wrapped with aluminum foil or the like.

Therefore, the present invention concerns a structure in which both surfaces are covered with a conductive coating, a metal sheet or the like having the finest possible mesh without impairing the air permeability thereof and in which the lines of electric force from both surfaces covered with such metal coatings, metal sheet or the like are shorted by a suitable number of short circuit lines.

BRIEF DESCRIPTION OF THE DRAWINGS

Further details will be apparent from the following description with particular reference to the accompanying drawings in which.

DETAILED DESCRIPTION OF THE PREFERRED EMBODIMENT

Figure 1A:
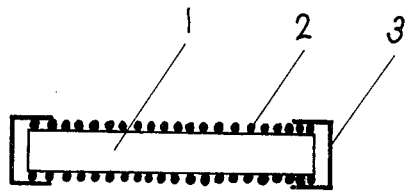
FIG. 1(a) and FIG. 1(b) show examples of the structure of electretized filter medium according to the present invention.
Figure 1B:
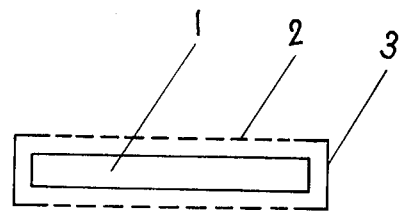

FIG. 1(a) as well as FIG. 1(b) shows a structure wherein an electretized filter medium (1) is covered with a metal coating or metal sheet (2) on both sides and wherein the metal coating or metal sheet on both sides is shorted by shorting lines or shorting foil (3).

It is to be noted that the shorting lines (3) or the like must be provided in a suitable number over the entire surface. Especially in the case where a metal sheet is used, shorting lines (3) or the like serve as a means to fix the metal sheet on both surfaces and, therefore, must be of adequate strength. The shorting lines may be in belt form over the entire surface. It is also possible for a metal sheet to be folded in two to enclose a filter medium between, its free ends being fixed with suitable electrically conductive material.

FIG. 1(a) is a typical example of the case where metal coating is used, and FIG. 1(b) is a typical example of the case where a metal sheet is used. Metal coating can be obtained by vacuum evaporation coating or spraying of aluminum or silver-aluminum, and in any case, it is necessary that coating should be applied thinly so as not to lose porosity. The metal sheet may be of the form shown in FIG. 2(a) and 2(c). Various other forms of metal sheet can be used as well. Various kinds of conductors having suitable properties may be used with some variation depending upon whether the coating form or the sheeting form is employed. Among such conductors are aluminum, silver, copper, brass, iron, stainless steel and carbon fiber.

According to the method as above-described, it is possible to obtain an electretized filter medium having a longer service life. At the same time, it is possible to increase the strength of the filter medium itself, especially where it is covered with a metal sheet.

Figure 3:
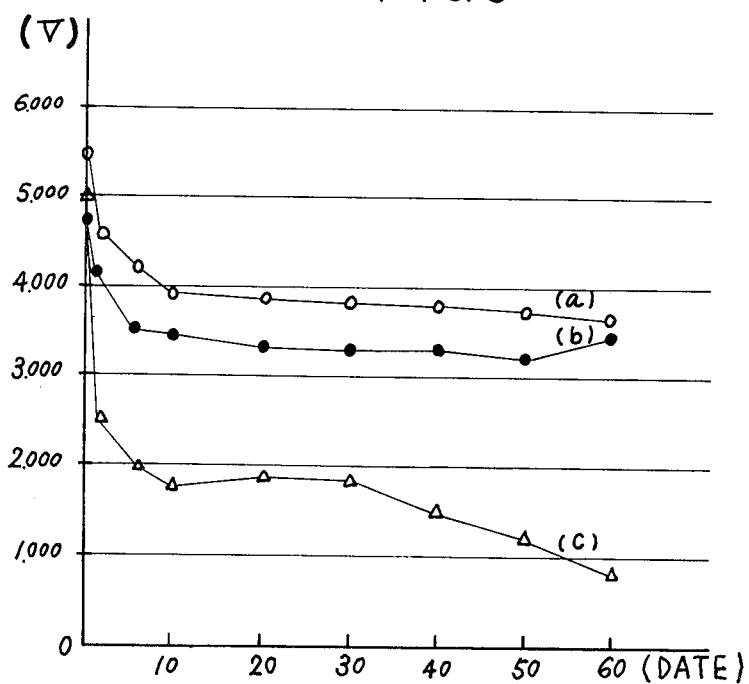
FIG. 3 shows a performance comparison of a medium having the structure according to this invention and one not having such a structure.

The following examples are exemplary of the method of the present invention:

(1) An electretized filter medium obtained by injecting corona discharge electrons or ions into a non-woven cloth of 6 polypropylene fiber, 500 g/m$^2$, 5 mm thick, was covered with a metal sheet of No. 26 stainless steel, 18-mesh, on both its surfaces, whereby the electric force lines on the both surfaces were shorted. The filter medium was used with a filtering apparatus, and then subjected to long-time air exposure on a dust collection efficiency measuring instrument. Electric potential measurements were done by a rotary sector type instrument. The non-woven cloth was removed from the metal sheet at the time of the measurements. The measurement results are shown in FIG. 3 as curve (a).

Figure 2:
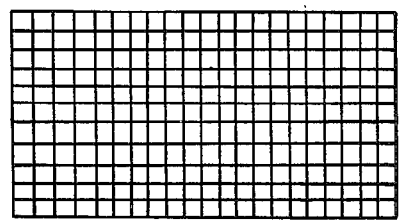
FIG. 2(a), (b) and (c) show examples of the metal sheet according to this invention.
Figure 2:
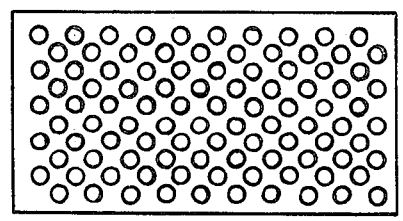
Figure 2:
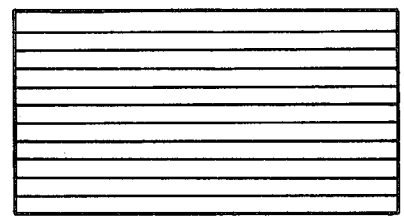

(2) An electretized filter medium obtained by injecting corona discharge electrons or ions into a non-woven cloth of 6 polypropylene fiber, 500 g/m$^2$, 5 mm thick, was covered with a metal sheet of aluminum wires aligned at 5 mm intervals (the structure as shown in FIG. 2(c), whereby the electric force lines on both surfaces were shorted. The filter was used with a filtering apparatus, and then subjected to long-time air exposure on a dust collecting efficiency measuring instrument. Electric potential measurements were done by a rotary sector type instrument. The non-woven cloth was removed from the metal sheet at the time of the measurements. The measurement results are shown in FIG. 3 as curve (b).

The performance of an electretized filter medium in which both surfaces were not shorted is shown in FIG.

3 as curve (c). It will be clear from FIG. 3 that in a filter medium having a structure according to the present invention, the surface charge density retained after an initial sharp drop is more than twice as much as that of a filter medium of the other type.

What is claimed is:

1. An improved electretized filtering means comprising:
   an electretized filter medium in a shape having opposite sides;
   two covering means, each having a high electrical conductivity and an air permeability at least as great as the air permeability of said electretized filter means, and covering the two opposite sides of said electretized filter medium; and
   a shorting means electrically connecting the two opposite side covering means.

2. An improved electretized filtering means as claimed in claim 1, wherein:
   said covering means is a vacuum evaporated coating of aluminum.

3. An improved electretized filtering means as claimed in claim 1; wherein:
   said covering means comprises a wire sheet.

4. An improved electretized filtering means as claimed in claim 1, wherein:
   said covering means is a coating of electrically conductive material.

5. An improved electretized filtering means as claimed in claim 4, wherein:
   said material is a material taken from the group consisting of aluminum, silver, copper, brass, iron, stainless steel and carbon fiber.

* * * * *